US009460188B2

(12) United States Patent
Mundlapudi et al.

(10) Patent No.: US 9,460,188 B2
(45) Date of Patent: Oct. 4, 2016

(54) DATA WAREHOUSE COMPATIBILITY

(71) Applicant: Bank of America Corporation, Charlotte, NC (US)

(72) Inventors: Bharath Mundlapudi, San Ramon, CA (US); Karthik Banala, Charlotte, NC (US); Rajesh Koneru, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 212 days.

(21) Appl. No.: 13/908,749

(22) Filed: Jun. 3, 2013

(65) Prior Publication Data

US 2014/0358845 A1 Dec. 4, 2014

(51) Int. Cl.
*G06F 17/30* (2006.01)

(52) U.S. Cl.
CPC ... *G06F 17/30592* (2013.01); *G06F 17/30563* (2013.01)

(58) Field of Classification Search
None
See application file for complete search history.

(56) References Cited

U.S. PATENT DOCUMENTS

| 6,044,374 | A * | 3/2000 | Nesamoney et al. | |
| 7,197,662 | B2 | 3/2007 | Bullen et al. | |
| 7,543,177 | B2 | 6/2009 | Bullen et al. | |
| 7,958,388 | B2 | 6/2011 | Bullen et al. | |
| 8,782,101 | B1 * | 7/2014 | Moore | 707/811 |
| 2005/0278152 | A1 * | 12/2005 | Blaszczak | G06F 17/30592 703/1 |
| 2009/0282089 | A1 * | 11/2009 | Lakshmanachar et al. | 707/204 |
| 2012/0089967 | A1 * | 4/2012 | Varadarajan | G06F 9/5033 717/136 |
| 2013/0073724 | A1 * | 3/2013 | Parashar | G06F 9/5072 709/224 |
| 2013/0132368 | A1 * | 5/2013 | Wolfram | 707/711 |
| 2013/0232157 | A1 * | 9/2013 | Kamel | 707/755 |
| 2013/0246339 | A1 * | 9/2013 | Kendrena et al. | 707/602 |
| 2014/0101091 | A1 * | 4/2014 | Brown | G06F 17/30342 707/602 |
| 2014/0101092 | A1 * | 4/2014 | Simitsis | G06F 17/30398 707/602 |
| 2014/0156591 | A1 * | 6/2014 | Sukumar et al. | 707/602 |
| 2014/0188784 | A1 * | 7/2014 | Guerra | 707/602 |
| 2014/0237459 | A1 * | 8/2014 | Von Platen | G06F 8/452 717/155 |
| 2014/0245298 | A1 | 8/2014 | Zhou et al. | |

OTHER PUBLICATIONS ca.com; CA Workload Automation AE-CA Technologies; www.ca.com/us/products/detail/CA-Workload-Automation-AE.aspx; last accessed Jun. 7, 2013.
The Apache Software Foundation; Welcome to Apache Hadoop!; www.hadoop.apache.org; Jun. 5, 2013; last accessed Jun. 7, 2013.
The Apache Software Foundation; Welcome to Hive!; www.hive.apache.org; May 16, 2013; last accessed Jun. 7, 2013.

(Continued)

*Primary Examiner* — James Trujillo
*Assistant Examiner* — Aida Tessema
(74) *Attorney, Agent, or Firm* — Banner & Witcoff, Ltd.; Michael A. Springs

(57) ABSTRACT

A compatibility processing module, for executing one or more processes to format and manipulate data, such that communication between previously-incompatible data warehouses is facilitated. In particular, a first warehouse is disclosed, wherein the first data warehouse is configured with a compatibility processing module, for receiving a large number of data points, and for executing one or more processes on a stored portion of the received data points such that the resulting processed data points are compatible with formatting conventions of a second data warehouse.

16 Claims, 10 Drawing Sheets

(56) References Cited

OTHER PUBLICATIONS

The Apache Software Foundation; Apache Oozie Workflow Scheduler for Hadoop; www.oozie.apache.org; Copyright 2011-2013; last accessed Jun. 7, 2013.

Cloudera, Inc.; The Platform for Big Data and the Leading Solution for Apache Hadoop in the Enterprise—Cloudera; www.cloudera.com/content/cloudera/en/home.html; last accessed Jun. 7, 2013.

Teradata; Global Leader in Data Warehousing, Big Data Analytic Technoolgies & Dat Driven Marketing—Teradata; www.teradata.com; last accessed Jun. 7, 2013.

"Understanding Analytic Workloads." Edwards et al. IBM Netezza Strategic Marketing. Netezza Corporation. 2011.

"Programming Hive." Capriolo et al. O'Reilly Media, Inc. Oct. 2012.

* cited by examiner

FIG. 7

| Item (701) | Price (710) | Rank (720) |
|---|---|---|
| Apple (702) | 0.25 (711) | 2 (721) |
| Orange (703) | 0.30 (712) | 3 (722) |
| Kiwi (704) | 0.30 (713) | 3 (723) |
| Banana (705) | 0.75 (714) | 5 (724) |
| Carrot (706) | 0.20 (715) | 1 (725) |
| Sprout (707) | 1.75 (716) | 6 (726) |

FIG. 9

| Item (901) | Category (911) | Price (921) | Rank (931) |
|---|---|---|---|
| Apple (902) | Fruit (912) | 0.25 (922) | 1 (932) |
| Orange (903) | Fruit (913) | 0.30 (923) | 2 (933) |
| Kiwi (904) | Fruit (914) | 0.30 (924) | 2 (934) |
| Banana (905) | Fruit (915) | 0.75 (925) | 4 (935) |
| Carrot (906) | Veg (916) | 0.20 (926) | 1 (936) |
| Sprout (907) | Veg (917) | 1.75 (927) | 2 (937) |

DATA WAREHOUSE COMPATIBILITY

TECHNICAL FIELD

Aspects of the invention generally relate to systems and methods for facilitating compatibility between data warehouses. In particular, various aspects of the systems and methods described herein include processes for establishing compatibility between an open-source data warehouse and a data warehouse configured to execute proprietary processes.

BACKGROUND

Analytical methods may be used to extract meaningful trends and patterns from sets of data. Business Intelligence (BI) Analytics refers to analytical methods, as applied by business enterprises, to extract trends and patterns from large datasets. These trends and patterns may subsequently be used to inform future business decisions.

The datasets considered by BI analytical methods may consist of hundreds of thousands, or millions of data points. One example of a data set considered by these analytical methods may be a record of user clicks on a website, over a given time period. In this example, the use of BI analytics may extract trends from clicking patterns to establish, in one instance, when a given user is most likely to be receptive to advertisements placed on the website. Due to the sheer number of data points, a data stream processed by BI analytical methods may measure several terabytes to several petabytes or more, and due to the storage space requirements, such datasets are often referred to as "big data."

Conventional analytical methods and processes for analyzing and storing "big data" may be ineffective, due to the size of the datasets, and the associated memory requirements. Accordingly, several companies have specialized in building software, and supporting hardware, to receive, store, and analyze large datasets. One such company is Teradata® Corporation, which produces data warehousing software solutions. A data warehouse, also referred to as an enterprise data warehouse, is a repository of data, whereby a stream of raw, unprocessed data, or previously-processed data, is received by a data warehouse, and processed by, in one implementation, Extract Transform and Load (ETL) processes, before being stored. ETL refers to the extraction of data from a source, the transformation, or formatting of the data, and the loading, or storing of the data. Such commercially available solutions may thus be referred to as proprietary solutions. Open-source solutions may be available from, e.g., The Apache Software Foundation. Open-source solutions may be associated with a plurality of open-source software and supporting hardware solutions. Proprietary solutions and open-source solutions may each offer their own unique advantages.

Apache Hadoop® is an example of an open-source solution framework that facilitates the use of distributed hardware for parallel processing of large datasets. Apache Hive is an example of an open-source data warehouse that expands upon the Hadoop® framework. Open-source solutions may include unique functionality relative to proprietary solutions. This functionality may include, for example, large scalability and expansion to include increased computational resources, such that the solution may be scaled for use with large collections of computer server clusters. Open-source solutions may also offer various cost savings due to their ability to run processes on non-specialized, commodity hardware and their ability to be implemented and utilized using a variety of programming languages. It will be appreciated, however, that proprietary solutions may similarly offer some or all of these advantages as well. Accordingly, an enterprise may choose to implement both open-source and proprietary solutions to analyze big data.

Although open-source and proprietary solutions each offer various advantages, individual solutions may implement one or more unique formats, protocols, and the like. As a result, open-source solutions may not be compatible with proprietary solutions and vice versa. An enterprise, however, may wish to exchange data between an open-source solution and a proprietary solution. As an example, an enterprise may desire for a proprietary data warehouse solution to be able to communicate with an open-source data warehouse solution and vice versa. As another example, a business may wish that employees familiar with a proprietary solution to be able to perform similar tasks on an open-source solution and vice versa.

Therefore, a need exists to establish compatibility between open-source data warehouse solutions and proprietary data warehouse solutions in order to utilize the unique advantages provided by each type of solution.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

In one aspect, this disclosure relates to a system for establishing compatibility between an open-source data warehouse a proprietary data warehouse. The system includes a distribution processing module, for receiving a data stream into a first data warehouse, and a distributed file system, for storing a portion of the data stream having a first data format in the first data warehouse. The system further executes an extract, transform, and load (ETL) operation, using the first data warehouse, on the stored portion of the data stream. The system further includes a compatibility processing module, for formatting the stored portion of the data stream having a second data format, such that the second data format is compatible with a second data warehouse.

In another aspect, this disclosure includes a non-transitory computer-readable storage medium with computer-executable instructions for receiving a data stream at a distribution processing module of a first data warehouse. Additionally, the storage medium includes instructions for storing a portion of the received data stream in a first data format, and executing an extract, transform, and load (ETL) operation. Furthermore, one or more transformation processes may be executed on the stored portion of the data stream by a compatibility processing module to reformat the stored portion of the data stream according to a second data format that is compatible with a second data warehouse.

In yet another aspect, this disclosure relates to a method of establishing compatibility between a first data warehouse and a second data warehouse, including receiving a data stream of raw data by a distribution processing module, storing at least a portion of the data stream in a distributed file system in a first data format, and executing an extract, transform, and load (ETL) operation on the stored portion of the data stream. The method further includes execution of one or more transformation processes, for formatting the stored portion of the data stream such that it is compatible with a second data warehouse using a second data format.

In another embodiment, the first data warehouse is an open-source data warehouse, the second data warehouse is a commercially available data warehouse, and the distributed file system configured is an open-source distributed file system.

Aspects of this disclosure address one or more of the issues mentioned above by disclosing methods, systems, non-transitory computer readable media, and apparatuses for establishing compatibility between an open-source data warehouse and a proprietary data warehouse. Aspects of the disclosure may also be provided in a non-transitory computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements.

FIG. 7 depicts an example dataset table output of a single-metric rank process.

FIG. 9 depicts an example dataset table output of a group-rank process.

DETAILED DESCRIPTION

Figure 1:
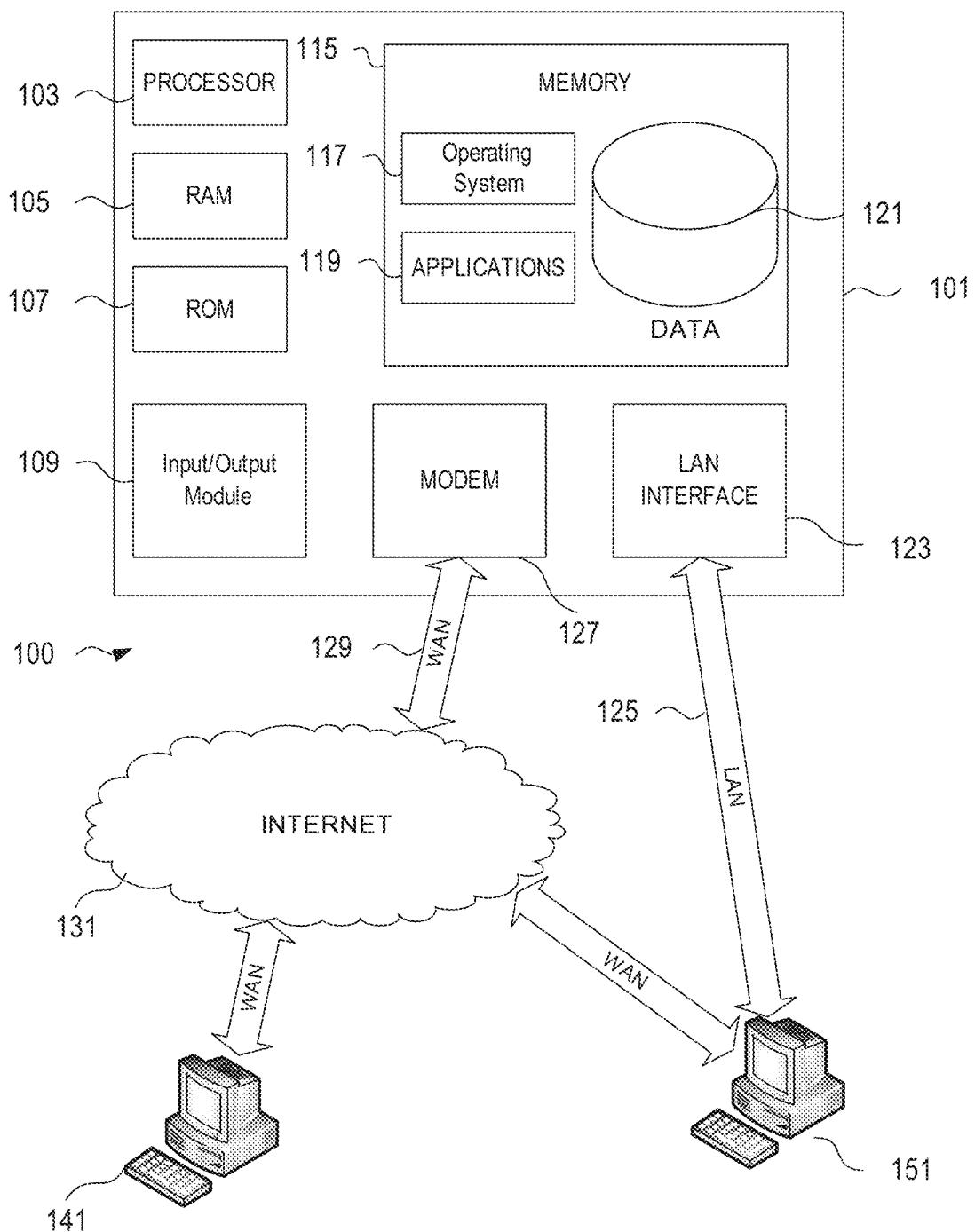
FIG. 1 shows an illustrative operating environment in which various aspects of the disclosure may be implemented.

As discussed above, there is a need to establish compatibility between an open-source data warehouse and a proprietary data warehouse. In accordance with various aspects of this disclosure, methods, systems, non-transitory computer-readable media, and apparatuses are disclosed in which a data stream is by a distribution processing module. The distribution processing module may store at least a portion of the data stream, wherein the stored portion of the data stream may be processed by an ETL processing module to extract, transform, and load (ETL) data into a data warehouse. During this extract, transform, and load process, at least a portion of the data stream may be further processed by a compatibility processing module, such that the stored portion of the data stream processed in the data warehouse may be understood by, and compatible with, another data warehouse, such as a proprietary data warehouse. In other words, the compatibility processing module acts as a "bridge" between a first data warehouse, and a second data warehouse, and may be used to implement processes not available to the first data warehouse, but available to the second data warehouse. In some example implementations, the first data warehouse may be an open-source data warehouse and the second data warehouse may be a proprietary data warehouse. In this way, the compatibility processing module facilitates the use of an open-source data warehouse to achieve increased system performance over a proprietary data warehouse, but still allows the data from the open-source data warehouse to be further processed by subsequent downstream systems that adhere to formatting and/or processing standards and conventions used by the proprietary data warehouse. It will be recognized with the benefit of this disclosure, however, that the principles described in this disclosure may be applied to establish compatibility between two or more open-source data warehouse solutions, two or more proprietary data warehouse solutions, and combinations of such.

In the context of this disclosure, an open-source environment refers to a single, or multiple computer systems, computer devices, or computer software applications, wherein an open-source environment may comprise, among others, an open-source data warehouse, which further includes an open-source data warehouse compatibility processing module, or simply a compatibility processing module, for establishing compatibility between an open-source data warehouse and a proprietary data warehouse. In this way, a compatibility processing module, and other processing modules in an open-source environment, may be considered as stand-alone computer systems, computer devices, or computer software applications, implemented as distributed computers across a network, such as the Internet, a wide area network, a local area network, or a storage area network, or any other type of communication network. In another implementation, separate computer systems may be implemented as separate cores of a processor on a common integrated circuit. However, in yet another implementation, a compatibility processor may share hardware, and supporting software resources, with one or more other processors and processes. In the description that follows in FIG. 1, a general computer system is described, which may be implemented as, in one embodiment, a compatibility processing module, among others.

FIG. 1 illustrates a block diagram of an example of an implementation of an open-source data warehouse 100. The open-source data warehouse 100 includes a compatibility processing module 101, which is shown in this example as a computing device 101. The computing device 101 may have a processor 103 for controlling overall operation of the compatibility processing module 101 and its associated components, including RAM 105, ROM 107, an input/output (I/O) module 109, and memory 115.

I/O module 109 may include a microphone, keypad, touch screen, and/or stylus through which a user of the computing device 101 may provide input, and may also include one or more of a speaker for providing audio output and a video display device for providing textual, audiovisual and/or graphical output. Software may be stored within memory 115 and/or storage to provide instructions to the processor 103 for enabling the computing device 101 to perform various functions. For example, memory 115 may store software used by the computing device 101, such as an operating system 117, application programs 119, and an associated database 121. The processor 103 and its associated components may allow the computing device 101 to run a series of computer-readable instructions to process and format data such that data processed by open-source data warehouse 100 is understood by/compatible with, a proprietary data warehouse.

The computing device 101 may operate in a networked environment supporting connections to one or more remote computers, such as terminals 141 and 151. The terminals 141 and 151 may be personal computers or servers that include many or all of the elements described above relative to the computing device 101. Alternatively, terminal 141 and/or 151 may be a data store that is affected by the operation of the alert management module 101. The network connections depicted in FIG. 1 include a local area network (LAN) 125 and a wide area network (WAN) 129, but may also include other networks. When used in a LAN networking environment, the computing device 101 is connected to the LAN 125 through a network interface or adapter 123. When used in a WAN networking environment, the computing device 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the computing device 101 according to an illustrative embodiment of the disclosure, may include computer-executable instructions for invoking functionality related to establishing compatibility of the data processed in an open-source data warehouse such that it is compatible with, and may be further processed by, a proprietary data warehouse with different standards and conventions for formatting of data, and the operations that may be executed on data.

The computing device 101 and/or terminals 141 or 151 may also be mobile terminals, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
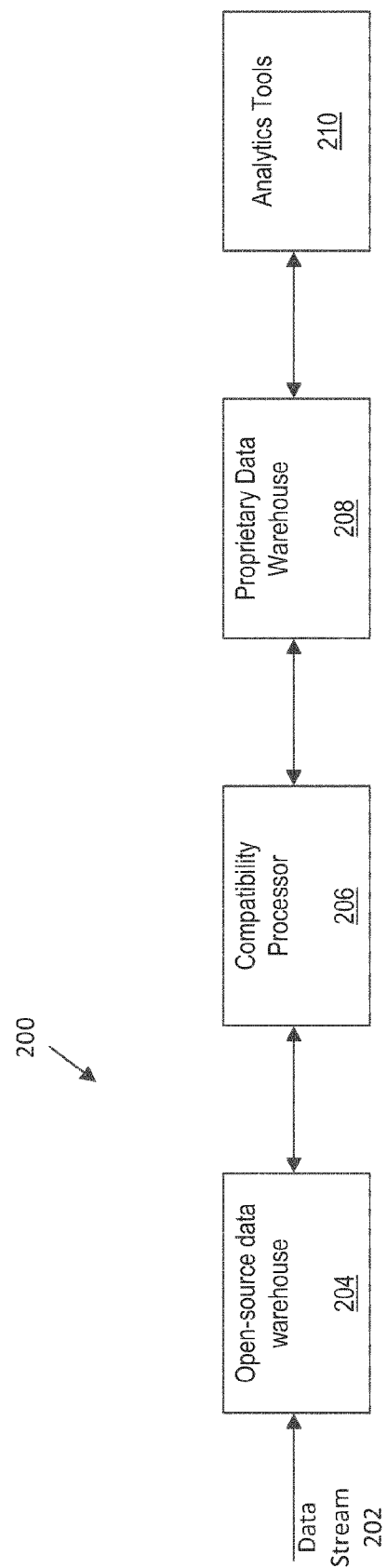
FIG. 2 is a schematic block diagram of a data warehouse compatibility system.

FIG. 2 is a schematic block diagram of a data warehouse compatibility system 200. In particular, system 200 includes a data stream 202, an open-source data warehouse 204, a compatibility processing module 206, a proprietary data warehouse 208, and analytics tools 210. Data warehouse compatibility system 200 may be used to communicate instructions between the proprietary data warehouse 208 and open-source data warehouse 204, such that processes available to the proprietary data warehouse 208, but not previously available to the open-source data warehouse 204, may be understood and executed by the open-source data warehouse 204. Further, the compatibility processing module 206 may facilitate communication of data between the open-source data warehouse 204 and the proprietary data warehouse 208, such that data generated by the open-source data warehouse 204 may be formatted accordingly to conventions used by the proprietary data warehouse 208, but not previously available to the open-source data warehouse 204.

In one implementation, open-source data warehouse 204 that facilitates, among others, processing and filing of large datasets across distributed hardware. In one implementation, the open-source data warehouse 204, serves as a data warehouse for data stream 202, wherein data stream 202 may represent one or more different sets of data received from one or more sources. Data stream 202 may be any form of digital or analog signal information, wherein a data point in data stream 202 may include a single, or a plurality of parameters. Generally, data stream 202 contains a large number of data points, which may measure into multiple million data points, and be stored across storage systems providing multiple terabytes or multiple petabytes or more storage space. Accordingly, data stream 202 may be generally referred to as "big data," wherein analytical methods configured for analysis of big data are well known in the art. Furthermore, system 200 is not limited to a continuous data stream 202, and data stream 202 may be supplied to open-source data warehouse 204 intermittently, or discretely.

The data contained in data stream 202 may relate to a plurality of different industries and systems. For example, data stream 202 may be: all sensor activations from one or more sensors over a given time period, financial information corresponding to all customers of a financial institution, or a record of all clicks within a website over a given time period. Those of ordinary skill will recognize that the systems and methods described herein can be embodied with any number of different data stream 202 data types, and the examples given should not limit the scope of the possible implementations of system 200. Furthermore, data stream 202 may include unprocessed, or raw, data from a data source, or may include data that was previously processed by another system, data communicated as a table of data points, or combinations thereof.

The open-source data warehouse 204 receives data stream 202, and processes the received data by executing one or more extract, transform, and load (ETL) operations. In one implementation, one or more extract processes select a part of data stream 202 to be considered. This part of data stream 202 may subsequently be transformed, by executing one or more processes to manipulate the extracted data. The transformation may, in one implementation, reduce the size of the data. In another implementation, transformation processes may increase the speed with which stored data can be searched and manipulated. The transformation processes may include: selecting only certain data values to load from data stream 202, translating coded data values, encoding data values, executing one or more processes to derive new data point values, sorting the data points, joining data points from multiple sources, aggregating one or more data points, generating surrogate-key values for one or more data points, transposing and/or pivoting data points stored in a table, splitting data points stored in a table column into multiple columns, separating data into multiple tables, and validating data points, among others.

Subsequently, one or more load processes may store part, or all, of the manipulated data in the open-source data warehouse 204. However, the processes executed during the transformation of the data may result in data that is not compatible with the format or protocol utilized by a proprietary data warehouse 208. In this way, an open-source data warehouse and a proprietary data warehouse may implement different data formatting conventions, protocol conventions, and the like.

Advantageously, the present disclosure describes a compatibility processing module 206, for executing processes to format data in the open-source data warehouse 204 such that it is understood by and is compatible with a proprietary data warehouse 208. The processes executed by compatibility processing module 206 may further include processes for implementing functionality present in proprietary data warehouse 208, but not available to the open-source data warehouse 204. In this way, compatibility processing module 206 allows a user, such as a business enterprise, to implement open-source solutions while still being able to coordinate data communication to entities using a proprietary data warehouse 208.

A data warehouse 204, facilitates storage, manipulation, and analysis of large sets of data, among others. Analysis of large sets of data may be valuable for business enterprises or organizations, for discovering trends or patterns in one or more datasets, and such that enterprises or organizations can make strategic decisions based on the trends in the data. This area of analysis of large data sets may be generally referred to as Business Intelligence (BI) analytics. In one implementation, BI analytical processes may be executed by a data warehouse. In another implementation, specialized analytical tools 210 are configured to extract data from a data warehouse. Advantageously, compatibility processing module 206 facilitates the use of specialized analytical tools 210 configured for use with proprietary data warehouse 208 and on open-source data warehouse 204.

Figure 3:
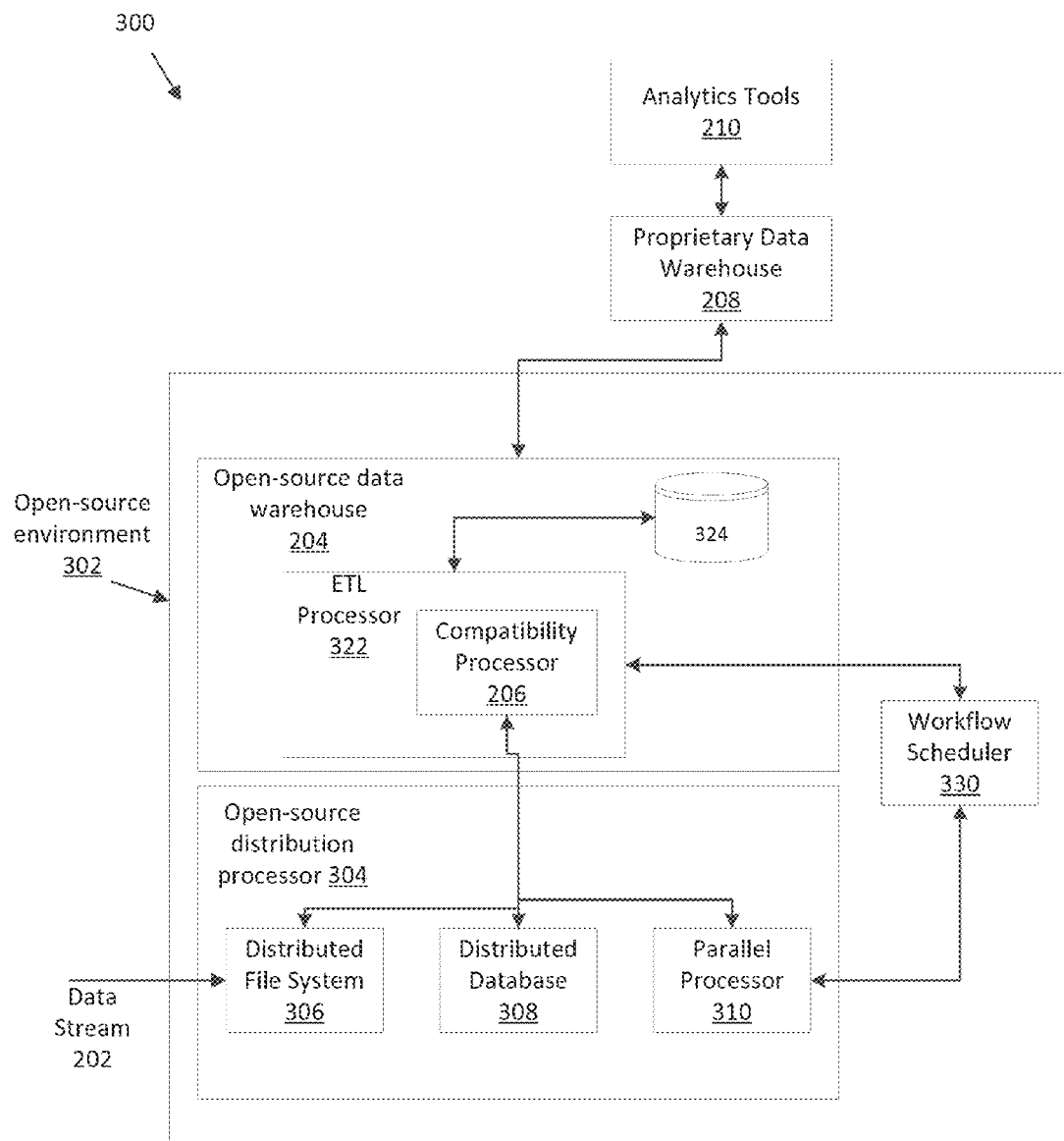
FIG. 3 is a schematic block diagram of a more detailed view of a data warehouse compatibility system.

FIG. 3 is a schematic block diagram of a more detailed data warehouse compatibility system 300. In particular, the data warehouse compatibility system 300 includes an open-source environment 302, a data stream 202, an open-source distribution processing module 304, a distributed file system 306, a distributed database 308, a parallel processing module 310, open-source data warehouse 204, ETL processing module 322, compatibility processing module 206, storage 324, workflow scheduler 330, proprietary data warehouse 208, and analytics tools 210.

Open-source environment 302 may be, in one implementation, an open-source system, wherein an open-source system refers to hardware, and supporting software, for executing processes associated with a data warehouse and/or a workflow scheduler. Specifically, the open-source distribution processing module 304 may be implemented as an open-source processing module, such that open-source distribution processing module 304 executes one or more processes to facilitate distributed storage and processing of data stream 202 across one or more computer systems or servers. The open-source system may be used to store and refine very large datasets in a relatively cost-effective manner on commodity, distributed hardware.

Data stream 202, may be received by the open-source distribution processing module 304. Open-source distribution processing module 304 may, in one implementation, communicate part, or all, of data stream 202 to distributed file system 306. Distributed file system 306 may be an open-source Distributed File System (DFS) 306, wherein the DFS 306 may store all, or part, of data stream 202 across one or more storage devices. The DFS 306 may be a Java-based system that typically has one or more metadata servers, referred to as namenodes, which store information related to the storage location of data, and a cluster of datanodes, which serve up memory blocks used to store the data. The one or more namenodes and the cluster of datanodes may be distributed such that a single namenode or datanode is implemented on a dedicated storage device. In another implementation, multiple namenodes and/or datanodes are present on a common storage device, but the DFS replicates data storage across multiple different storage devices to achieve redundancy. In one implementation, the DFS stores the data stream 202 in non-volatile, or persistent memory, such as hard disk drives (HDDs), solid state drives (SSDs), optical disk (CDs, DVDs, and the like), tape, read only memory (ROM) chips, or any other non-volatile storage medium. In another implementation, DFS 306 stores part, or all, of data stream 202 in volatile memory, such as random access memory (RAM), that is cleared by a power cycle or other reboot operation.

Open-source distribution processing module 304 may, in one embodiment, use a distributed database 308. Distributed database 308 may be open-source distributed database 308. Distributed database 308 may expand upon the functionality of DFS 306, and executes processes to, among others, access small amounts of data from a large dataset stored in DFS 306. Distributed database 308 is configured to search and access smaller pieces of data from larger datasets with lower latency than can be achieved using DFS 306 alone.

Open-source distribution processing module 304 may have a parallel processing module 310, configured to execute one or more map and reduce processes on data stored in distributed file system 306 or distributed database 308. Map and reduce processes allow large data sets to be manipulated using parallel processing. In practice, map reduce processes may be implemented by a plurality of distributed computers, or nodes, such that a mapping step divides a computational process to be executed into a plurality of smaller computational processes, and distributes these smaller computational problems for processing by the plurality of distributed nodes. Subsequently, a reduce step receives the returned results from the processes executed by the plurality of nodes, and combines the results, producing parallel-processed data as an output.

Data stored in the distributed file system 306, the distributed database 308, or manipulated by parallel processing module 310 may be communicated to open-source data warehouse 204 as described in relation to FIG. 2. Data warehouse 204 facilitates extract, transform, and load (ETL) processes using ETL processing module 322. Using ETL processing module 322, the data stream 202, part, or all, of which may be stored in distributed file system 306 and distributed database 308, is further processed and stored such that patterns and trends can be found from data stream 202, or such that data will be formatted for analysis by other analytical tools. The result of ETL processes executed by ETL processing module 322 may be one or more refined, or parsed, datasets that may exclude data points that do not conform to a predetermined pattern or structure.

Open-source data warehouse 204 includes storage 324, for storing the refined, or parsed data from the ETL processing module 322, wherein storage 324 may be one or more storage devices consolidated in a single server rack, or distributed across a LAN, WAN, the Internet, or any other communication network. The storage devices may be non-volatile storage devices, such as HDDs, SSDs, optical disks, storage tapes, ROM and the like. In another implementation, the one or more storage devices represented by storage 324 may be volatile storage, such as RAM.

In one implementation, as described in relation to FIG. 2, it may be desirable for open-source data warehouse 204 to communicate with a proprietary data warehouse 208. In some situations, a business enterprise user, may be operating an open-source data warehouse 204, but may communicate data to other entities that use a proprietary data warehouse 208. Previously, certain data formatting conventions executed by open-source data warehouse 204 may not have been compatible with proprietary data warehouse 208, hence data from open-source data warehouse 204 could not be read and understood by proprietary data warehouse 208. Additionally, it may desirable for processes that may be executed in proprietary data warehouse 208 to be similarly executed in open-source data warehouse 204. However, previously, there existed certain processes that may have been specific to proprietary solutions, and could not be executed in open-source solutions.

Accordingly, in order to establish compatibility between open-source data warehouse 204 and proprietary data warehouse 208, compatibility processing module 206 may execute one or more processes to format data, and implement proprietary functionality, during ETL processes by ETL processing module 322. Compatibility processing module 206 may be configured to execute a plurality of processes to, in one embodiment, selectively configure data point date formats, configure a precision of a data value, change the data type of a data value, and perform ranking operations on a data set, and the like. In particular, five example compatibility processes executable by compatibility processing module 206 are described in relation to FIGS. 4-10.

In another implementation, open-source environment 302 has a workflow scheduler 330, for managing the sequence in which a plurality of computational processes are executed by, in one embodiment, parallel processing module 310, and ETL processing module 322, among others. Workflow scheduler 330 may be embodied as an open-source workflow scheduler configured to manage various computational jobs.

Open-source workflow scheduler 330 is configured with a control dependency direct acyclic graph, which is a list of actions that are to be performed in a given order, such that a second action in the control dependency direct acyclic graph is not executed until a first action has been executed, and so on. A direct acyclic graph may be embodied as an workflow, wherein the workflow comprises control flow nodes, and action nodes. Control flow nodes are groups of one or more executable instructions including, among others, a delineation of a start or an end of a workflow, or computational task. Control flow nodes may also be configured to execute decision processes such that data is processed according to a selected process, wherein the selected process is chosen from a plurality of possible processes, and the selection is made based on one or more attributes of the data. Action nodes are groups of one or more executable instructions that may be communicated to the workflow scheduler by, in one embodiment, parallel processing module 310. In this way, one or more action nodes may group together a plurality of map/reduce processes to be executed on data stream 202.

Figure 4:
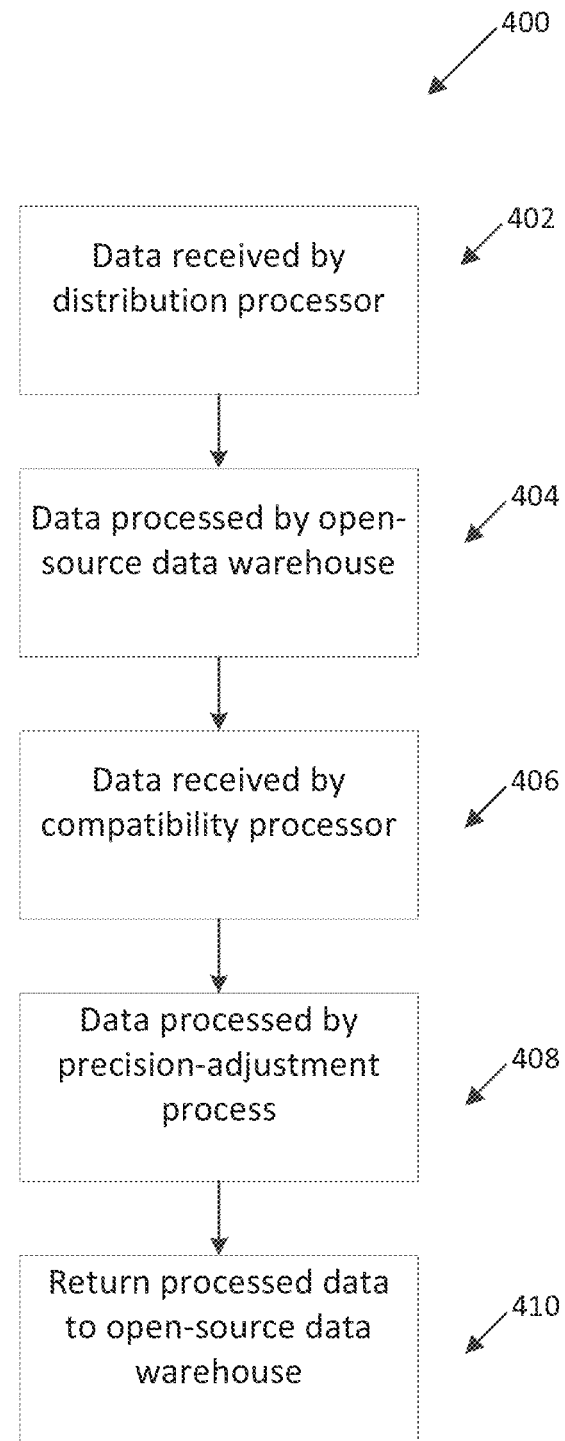
FIG. 4 is a flowchart diagram of a precision-adjustment process.

FIG. 4 is a flowchart diagram of a precision-adjustment process 400, executed by the compatibility processing module 206. In one implementation, a data warehouse 204, may have one or more processed data points with precision values that are incompatible with a proprietary data warehouse 208. In response, compatibility processing module 206 may execute process 400 to configure the received data point value according to formatting conventions employed in proprietary data warehouse 208.

In particular, precision-adjustment process 400 may begin at step 402, wherein one or more data points are received from a data stream 202 by open-source distribution processing module 304. The data points may be processed by open-source distribution processing module 304 according to the descriptions given in relation to FIG. 2 and FIG. 3. Subsequently, one or more selected data points may be communicated to open-source data warehouse 204, wherein the one or more selected data points may be further processed by extract, transform, and load operations, as described in relation to ETL processing module 322 from FIG. 3, and indicated at step 404 of process 400.

Subsequently, the one or more selected data points may be received by compatibility processing module 206 at step 406. In one implementation, compatibility processing module 206 may execute processes to adjust the precision of the received one or more data points in response to one or more instructions from ETL processing module 322. In another implementation, compatibility processing module 206 will execute processes to adjust the precision of a data point in response to a request from proprietary data warehouse 208. At step 408 a data point value is passed to the precision-adjustment process, and formatted according to a rounding factor, wherein the rounding factor is indicative of the precision requested for the passed data point value. In one implementation, the rounding factor is a fixed value associated with the compatibility processing module 206, and used to adjust the precision of all data points passed to compatibility processing module 206. In another implementation, the rounding factor may vary according to the data type passed to the compatibility processing module. For example, a "float" data type may have a first associated rounding factor, and a "double" data type may have a second associated rounding factor, and the like. A plurality of rounding factors associated with data points of different types and formats may be stored in compatibility processing module 206, or a rounding factor may be passed to compatibility processing module 206 by another processing module, such as a processing module associated with proprietary data warehouse 208.

In one example implementation, a precision-adjustment process 400 may be executed by compatibility processing module 206 such that a data point value of 11.59 is passed to compatibility processing module 206 with a rounding factor of 0.98. In response compatibility processing module may return a data point value of 12, wherein this processed data point value may have a precision that is adjusted from open-source formatting conventions to proprietary formatting conventions (and vice versa).

In one implementation, process 400 is completed at step 410, wherein compatibility processing module 206 returns the precision-adjusted data point to the open-source data warehouse 204. This returned data point may be stored as a compatible data point value, and, in one implementation, subsequently passed to proprietary data warehouse 208 and analytics tools 210 for further processing.

Figure 5:
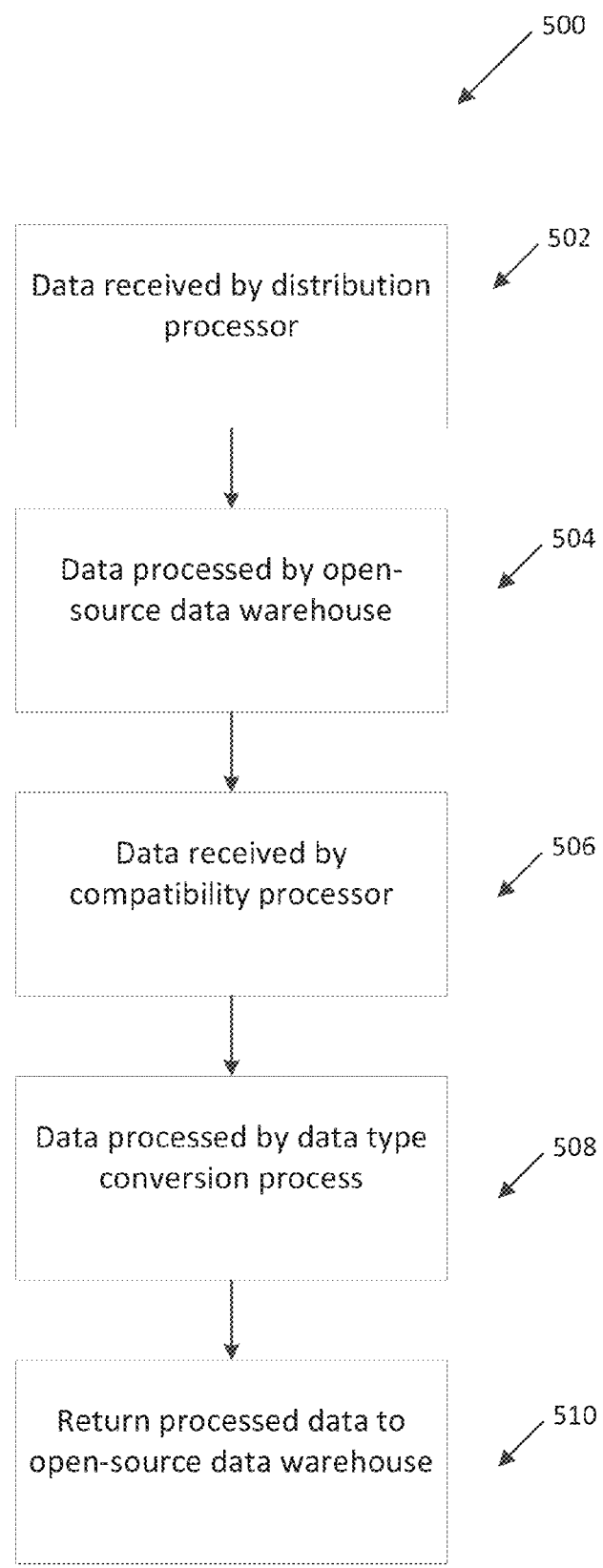
FIG. 5 is a flowchart diagram of a data-type conversion process.

FIG. 5 is a flowchart diagram of a data-type conversion process 500, executed by compatibility processing module 206. In one implementation, a data warehouse 204, may have one or more processed data points with data types that are one of a float data type, a double data type, or an integer ("int") data type, wherein float, double, and integer data types may be incompatible with a decimal data type implemented in a proprietary data warehouse 208. Advantageously, compatibility processing module 206 may execute process 500 to format data types of an open-source solution into data types of a proprietary solution (and vice versa).

In particular, data-type conversion process 500 may begin at step 502, wherein one or more data points are received from a data stream 202 by open-source distribution processing module 304. The data points may be processed by open-source distribution processing module 304, wherein the processes are described in greater detail above, and with reference to FIG. 2 and FIG. 3. Subsequently, one or more selected data points may be communicated to open-source data warehouse 204, wherein the one or more selected data points may be further processed by extract, transform, and load operations, described above with reference to ETL processing module 322 from FIG. 3, and indicated at step 504 of process 500.

Subsequently, the one or more selected data points may be received by compatibility processing module 206 at step 506. In one implementation, compatibility processing module 206 may execute processes to convert the data type of the received one or more selected data points into a decimal data type in response to one or more instructions received from ETL processing module 322. In another implementation, compatibility processing module 206 will execute processes to convert the data type of the received one or more selected data points into a decimal data type in response to a request from proprietary data warehouse 208.

At step 508 a data point value is passed to the data type adjustment process, and formatted according to a significant digit factor and a scale factor. The significant digit factor represents the number of significant digits that the adjusted data point will have, and the scale factor represents the number of decimal places that the adjusted data point will be formatted to. In one implementation, the significant digit factor and the scale factor are fixed values associated with the compatibility processing module 206, and used to adjust the data type of all data points passed to compatibility processing module 206. In another implementation, the significant digit factor and the scale factor may vary according to the data type passed to the compatibility processing module. Furthermore, the significant digit factor and the scale factor be passed to compatibility processing module 206 by another processing module, such as a processing module associated with proprietary data warehouse 208.

In one exemplary implementation, a data-type conversion process 500 may be executed by compatibility processing module 206 such that a data point value of 00123.456789 is passed to compatibility processing module 206 with a significant digit factor of 6 and a scale factor of 3. In response, compatibility processing module may return a converted data point value of 123.456, such that the processed data point value of 123.456 may be formatted to be compatible with open-source or proprietary formatting conventions, protocols, and the like.

In one implementation, process 500 is completed at step 510, wherein compatibility processing module 206 returns the data type converted data point to the open-source data warehouse 204. This returned data point may be stored as a compatible data point value, and, in one implementation, subsequently passed to proprietary data warehouse 208, and analytics tools 210, for further processing.

Figure 6:
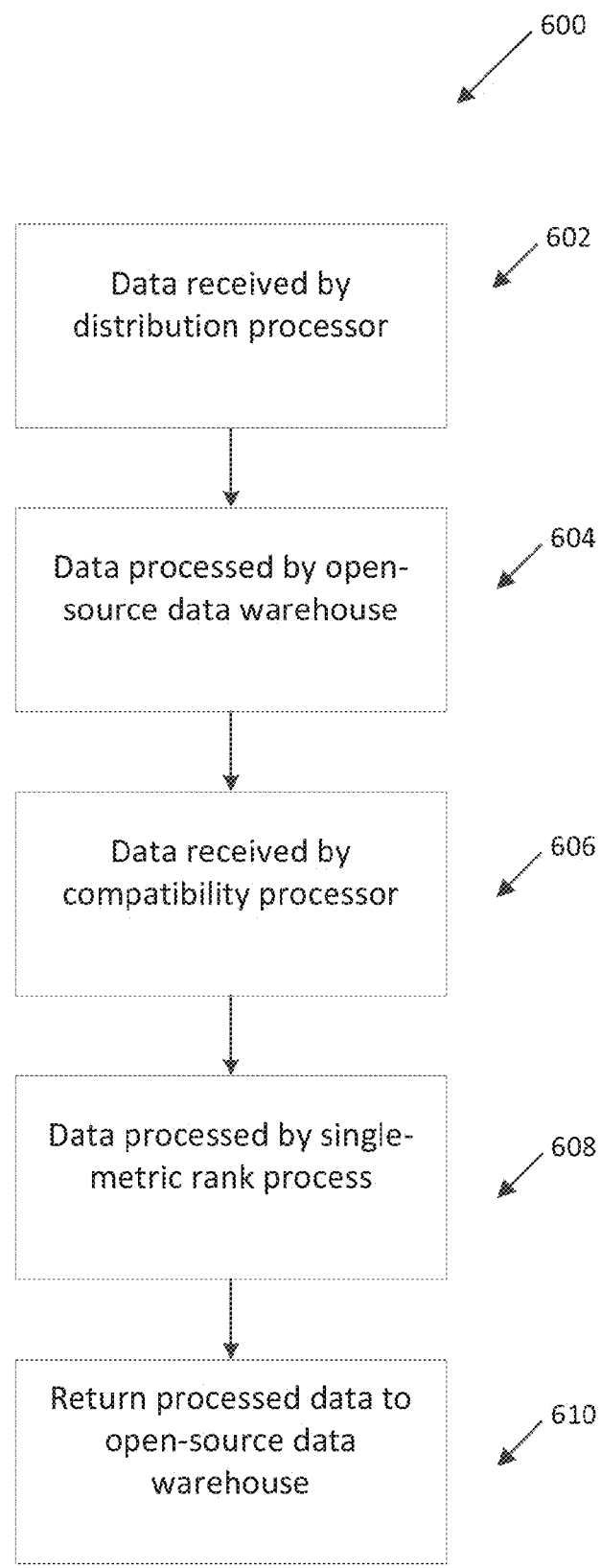
FIG. 6 is a flowchart diagram of a single-metric rank process.

FIG. 6 is a flowchart diagram of a process 600 for determining a rank of one or more data point values in a dataset, and using a single metric to rank the data points. Compatibility processing module 206 may execute process 600 on a dataset, wherein the dataset may be formatted as a table, and wherein the rows of the table may represent data-point groups, and the columns of the table may represent metrics associated with the data-point groups. These metrics may include, but are not limited to, one or more of a data point data type, a data point identification number, a data point name, and a data point numerical value, and the like. In one implementation, that a data warehouse 204, may not have the functionality to execute a single-metric rank process 600. However, it may be desirable for proprietary systems and methods to execute a single-metric rank process 600 on a dataset from an open-source solution, or to access single-metric rank information that is compatible with formatting conventions used by the proprietary solution. Advantageously, compatibility processing module 206 may execute single-metric rank process 600 to rank a dataset, and return a dataset that is ranked by a single metric, and that is compatible with proprietary systems and methods (or vice versa).

In particular, single-metric rank process 600 may begin at step 602, wherein one or more data points are received from a data stream 202 by open-source distribution processing module 304. The data points may be processed by open-source distribution processing module 304, wherein the processes are described in greater detail above, and with reference to FIG. 2 and FIG. 3. Subsequently, one or more selected data points may be communicated to open-source data warehouse 204, wherein the one or more selected data points may be further processed by extract, transform, and load operations, described above with reference to ETL processing module 322 from FIG. 3, and indicated at step 604 of process 600. These extract, transform, and load operations may format the received data points into a dataset stored as a table, wherein the rows of the table represent data-point groups, and the columns of the table represent metrics associated with the data-point groups.

At step 606, the one or more datasets may be communicated to compatibility processing module. In one implementation, compatibility processing module 206 may execute processes to rank a dataset by a single metric, and in response to one or more instructions received from ETL processing module 322. In another implementation, compatibility processing module 206 may execute processes to rank a dataset by a single metric in response to a request from proprietary data warehouse 208.

Step 608 represents one or more formatting processes executed on a table of data points representative of a dataset, wherein the one or more formatting processes rank the rows of the table according to a single value (metric) associated with each row. Compatibility processing module 206 may iterate through the rows of a received dataset, and compare the value of a single metric to a single metric associated with all other rows in the dataset. Upon comparison, by compatibility processing module 206, of the single metric associated with a row of the dataset table, to a single metric associated with each of the other rows of the dataset table, compatibility processing module 206 may assign a rank value to the row. In one example implementation, a single-metric rank process 600 may output a ranked dataset table such as dataset table 700 from FIG. 7.

In one implementation, process 600 is completed at step 610, wherein compatibility processing module 206 returns the ranked dataset to the open-source data warehouse 204. This returned dataset may be stored as a compatible dataset, and, in one implementation, subsequently passed to proprietary data warehouse 208 and analytics tools 210 for further processing.

FIG. 7 is an example of a ranked dataset table 700. Ranked dataset table 700 may be an output result of a single-metric rank process 600. In particular, table 700 is an output of a single-metric rank process 600 such that items 702-707 are ranked in order of increasing prices 711-716. In one implementation, single-metric rank process 600 receives table 700 with an item column 701 containing item name data point values 702-707, and a price column 710 containing price data point values 711-716. Compatibility processing module 206 may, in response to receipt of table 700, execute process 600, and append a rank column 720, wherein rank column 720 stores rank data point values 721-726 calculated based on a single-metric. For this example table 700, the single-metric is price 710, and the rankings 721-726 are in order of increasing price value 710.

Figure 8:
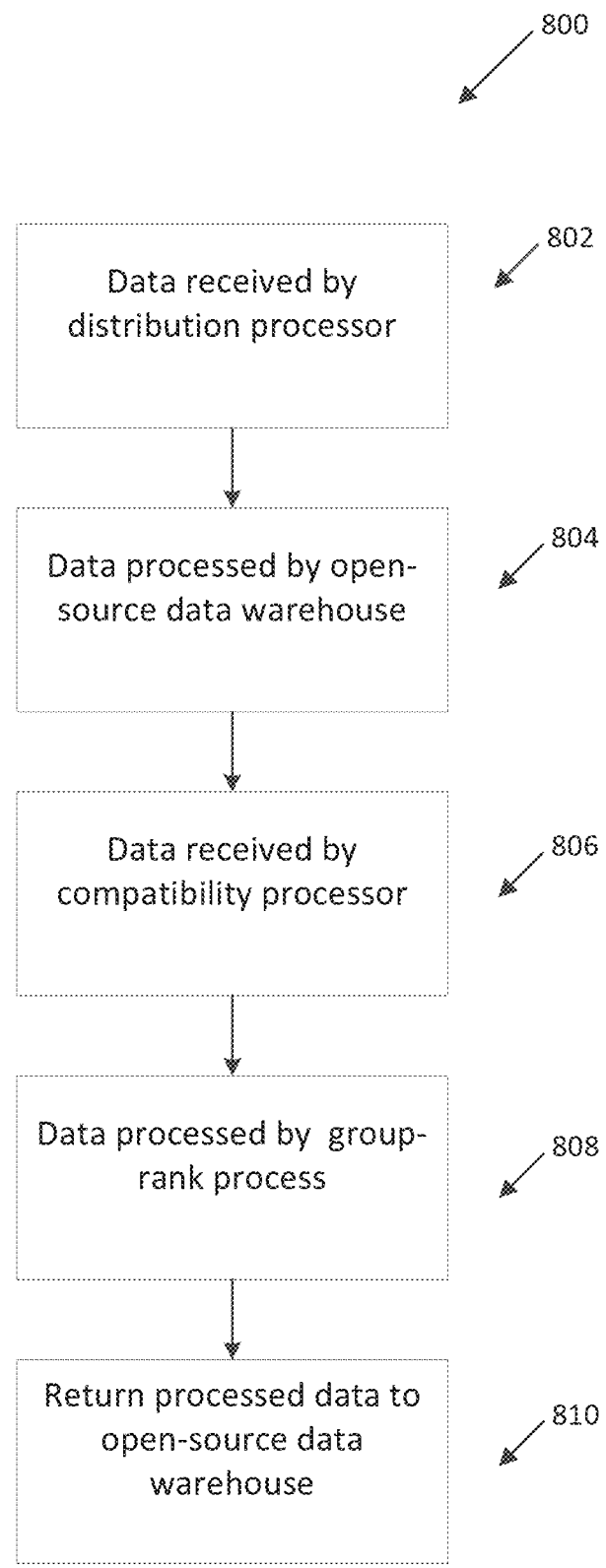
FIG. 8 is a flowchart diagram of a group-rank process.

FIG. 8 is a flowchart diagram of a process 800 for determining a rank of one or more data point values in a dataset, using two or more metrics to rank the data points. Compatibility processing module 206 may execute process 800 on a dataset, wherein the dataset may be formatted as a table, and wherein the rows of the table represent data-point groups, and the columns of the table represent metrics associated with the data-point groups. These metrics may include, but are not limited to, one more of a data point data type, a data point identification number, a data point name, and a data point numerical value, and the like. In one implementation, a data warehouse 204, may not have the functionality to execute a single-metric rank process 600. However, is may be desirable for certain proprietary systems and methods to execute a group-rank process 800 on a dataset from an open-source solution, or to access single-metric rank information that is compatible with formatting conventions used by proprietary solutions. Advantageously, compatibility processing module 206 may execute group-rank process 800 to rank a dataset, and return a dataset ranked by two or more metrics, and compatible with proprietary systems and methods (or vice versa).

In particular, group-rank process 800 may begin at step 802, wherein one or more data points are received from a data stream 202 by open-source distribution processing module 304. The data points may be processed by open-source distribution processing module 304, wherein the processes are described in greater detail above, and with reference to FIG. 2 and FIG. 3. Subsequently, one or more selected data points may be communicated to open-source data warehouse 204, wherein the one or more selected data points may be further processed by extract, transform, and load operations, described above with reference to ETL processing module 322 from FIG. 3, and indicated at step 804 of process 800. These extract, transform, and load operations may format the received data points into a dataset stored as a table, wherein the rows of the table represent data-point groups, and the columns of the table represent metrics associated with the data-point groups.

At step 806, the one or more datasets may be communicated to compatibility processing module. In one implementation, compatibility processing module 206 may execute processes to rank a dataset by two or more metrics, and in response to one or more instructions received from ETL processing module 322. In another implementation, compatibility processing module 206 will execute processes to rank a dataset by two or more metrics in response to a request from proprietary data warehouse 208.

Step 808 represents one or more formatting processes executed on a table of data points that is representative of a dataset, wherein the one or more formatting processes rank the rows of the table according to two or more values (metric group) associated with each row. Compatibility processing module 206 may iterate through the rows of a received dataset, and compare the values of two or more metrics with the values of two or more metrics from every other row in the dataset. Upon completion of this comparison process, compatibility processing module 206 may assign a rank value to every row of the dataset. In one example implementation, a group-rank process 800 may output a ranked dataset table such as dataset table 900 from FIG. 9.

In one implementation, process 800 is completed at step 810, wherein compatibility processing module 206 returns the ranked dataset to the open-source data warehouse 204. This returned dataset may be stored as a compatible dataset, and, in one implementation, subsequently passed to proprietary data warehouse 208 and analytics tools 210 for further processing.

FIG. 9 is an example of a ranked dataset table 900. Ranked dataset table 900 may be the output result of a group-rank process 800. In particular, table 900 is an output of group-rank process 900 such that items 901-907 are ranked based on a category column 911, with data point values 912-917, and a price column 921, with data point values 922-927. In one implementation, group-rank process 800 receives table 900 with an item column 901 containing item name data point values 902-907, a category column 911 containing category data point values 912-917, and a price column 921 containing price data point values 922-927. Compatibility processing module 206 may, in response to receipt of table 900, execute process 800, and append a rank column 931 to table 900, wherein rank column 931 stores rank data point values 932-937 calculated based on category data point values 912-917, and price data point values 922-927 in order of increasing price.

Figure 10:
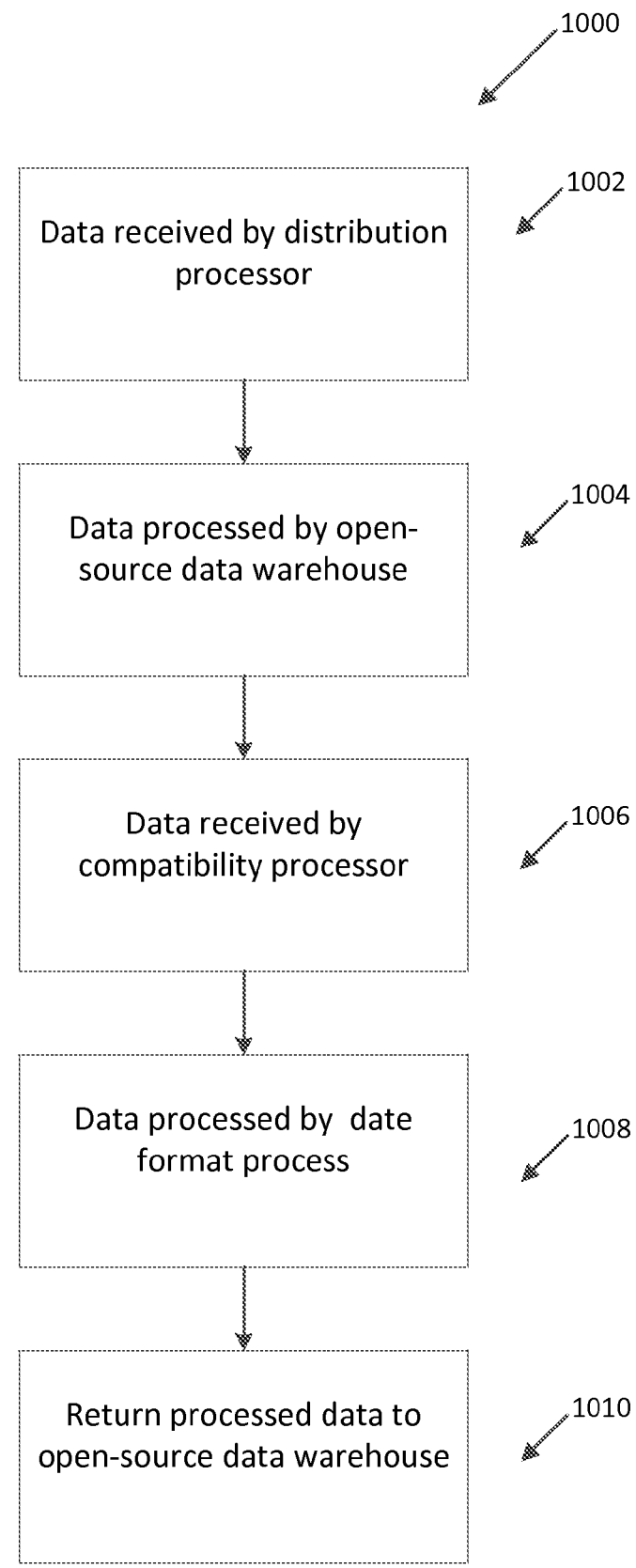
FIG. 10 is a flowchart diagram of a date formatting process.

FIG. 10 is a flowchart diagram of a process 1000 for formatting one or more dates contained in a dataset, and executed by compatibility processing module 206. In one implementation, date formatting process 1000 may receive a data point value from an open-source data warehouse 204. In one implementation, a data warehouse 204, may not support date formats such as those used in a proprietary data warehouse 208. Advantageously, compatibility processing module 206 may execute process 1000 to reformat one or more date values such that they are compatible with proprietary systems and methods (and vice versa).

In particular, date formatting process 1000 may begin at step 1002, wherein one or more data points are received from a data stream 202 by open-source distribution processing module 304. The data points may be processed by open-source distribution processing module 304, wherein the processes are described in greater detail above, and with reference to FIG. 2 and FIG. 3. Subsequently, one or more selected data points may be communicated to open-source data warehouse 204, wherein the one or more selected data points may be further processed by extract, transform, and load operations, described above with reference to ETL processing module 322 from FIG. 3, and indicated at step 1004 of process 1000.

Subsequently, the one or more selected data points may be received as a dataset by compatibility processing module 206 at step 1006. In one implementation, compatibility processing module 206 may execute processes to convert the data type of the received one or more selected data points into a decimal data type in response to one or more instructions received from ETL processing module 322.

In response to receipt of a dataset, compatibility processing module 206 may execute a date formatting process. Step 1008 represents the processing of the received dataset, such that the dataset output from process 1000 contains date values that are compatible with proprietary systems and methods (and vice versa). In one implementation, a date value may be represented as a string in open-source data warehouse 204, e.g. string "20121121." Process 1000 may format this date value such that is may be understood by proprietary systems and methods, and such that it has a format of 2012-11-21.

In one implementation, process 1000 is completed at step 1010, wherein compatibility processing module 206 returns a dataset with formatted date values to the open-source data warehouse 204. This returned dataset may be stored as a dataset compatible with a proprietary solution, and, in one implementation, subsequently passed to proprietary data warehouse 208 and analytics tools 210 for further processing. In view of the foregoing, it will be appreciated that processes 400, 500, 600, 800, and 1000 are only examples, and that additional or alternative processes may be employed to achieve compatibility, by compatibility processing module 206.

The present disclosures further provide technical advantages. As noted above, a compatibility processing module 206 facilitates compatibility of data processed by an open-source, data warehouse 204, with a proprietary data warehouse 208. In this way, compatibility processing module 206, by implementing a plurality of processes, wherein processes 500, 600, 800, and 1000 are examples thereof, facilitates operation of open-source data warehouse 204 in a business enterprise environment, while retaining compatibility with systems and methods configured to accept data formatted according to proprietary conventions (and vice versa). Accordingly, an entity processing data using open-source data warehouse 204 may benefit generally from the advantages offered by that include, but are not limited to, increased computational efficiency resulting from distributed processing, improved scalability to include additional computational resources in large collections of computer server clusters, and cost savings for users due to an ability to run processes on non-specialized, commodity hardware. Furthermore, the solutions may be implemented and utilized using a variety of programming languages.

Some embodiments of the above described may be conveniently implemented using a conventional general purpose or a specialized digital computer or microprocessor programmed according to the teachings herein, as will be apparent to those skilled in the computer art. Appropriate software coding may be prepared by programmers based on the teachings herein, as will be apparent to those skilled in the software art. Some embodiments may also be implemented by the preparation of application-specific integrated circuits or by interconnecting an appropriate network of conventional component circuits, as will be readily apparent to those skilled in the art. Those of skill in the art would understand that information and signals may be represented using any of a variety of different technologies and techniques. For example, data, instructions, requests, information, signals, bits, symbols, and chips that may be referenced throughout the above description may be represented by voltages, currents, electromagnetic waves, magnetic fields or particles, optical fields or particles, or any combination thereof.

Some embodiments include a computer program product comprising a computer readable medium (media) having instructions stored thereon/in and, when executed (e.g., by a processor), perform methods, techniques, or embodiments described herein, the computer readable medium comprising sets of instructions for performing various steps of the methods, techniques, or embodiments described herein. The computer readable medium may comprise a storage medium having instructions stored thereon/in which may be used to control, or cause, a computer to perform any of the processes of an embodiment. The storage medium may include, without limitation, any type of disk including floppy disks, mini disks (MDs), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any other type of media or device suitable for storing instructions and/or data thereon/in. Additionally, the storage medium may be a hybrid system that stored data across different types of media, such as flash media and disc media. Optionally, the different media may be organized into a hybrid storage aggregate. In some embodiments different media types may be prioritized over other media types, such as the flash media may be prioritized to store data or supply data ahead of hard disk storage media or different workloads may be supported by different media types, optionally based on characteristics of the respective workloads. Additionally, the system may be organized into modules and supported on blades configured to carry out the storage operations described herein.

Stored on any one of the computer readable medium (media), some embodiments include software instructions for controlling both the hardware of the general purpose or specialized computer or microprocessor, and for enabling the computer or microprocessor to interact with a human user and/or other mechanism using the results of an embodiment. Such software may include without limitation device drivers, operating systems, and user applications. Ultimately, such computer readable media further includes software instructions for performing embodiments described herein. Included in the programming (software) of the general-purpose/specialized computer or microprocessor are software modules for implementing some embodiments.

Accordingly, it will be understood that the invention is not to be limited to the embodiments disclosed herein, but is to be understood from the following claims, which are to be interpreted as broadly as allowed under the law.

Those of skill would further appreciate that the various illustrative logical blocks, modules, circuits, techniques, or method steps of embodiments described herein may be implemented as electronic hardware, computer software, or combinations of both. To illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the embodiments described herein.

The various illustrative logical blocks, modules, and circuits described in connection with the embodiments disclosed herein may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. In general, functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

What is claimed is:

1. A system for establishing compatibility between an open-source data warehouse and a proprietary data warehouse, the system comprising:
   a distribution processing module which receives a set of unprocessed, raw data points;
   a distributed file system which stores the set of data points according to a first data format;
   a first data warehouse which executes an extract, transform, and load (ETL) operation on the set of data points, the ETL operation comprising an extract process which selects from the set of data points a subset of data points for transformation and loading into a second data warehouse that uses a second data format; and
   a workflow scheduler which schedules execution of the ETL operation according to a workflow implemented as a directed acyclic graph comprising a plurality of action nodes that each specify an action to perform for the ETL operation wherein the plurality of action nodes comprise at least one action node that specifies a map and reduce process to perform on the subset of data points;
   wherein the ETL operation further comprises one or more transformation processes, each transformation process comprising transforming individual data points in the subset of data points to obtain a set of transformed data points having the second data format;
   wherein the one or more transformation processes comprise a group rank process, the group rank process comprising ranking a data subset that comprises a plurality of data points from the set of data points, the ranking based on a plurality of metrics, and the group rank process further comprising storing the data subset in a ranked data table comprising a first column corresponding to a first metric of the plurality of metrics, a second column corresponding to a second metric of the plurality of metrics, and a third column corresponding to a rank; and
   wherein the ETL operation further comprises a load process comprising loading the set of transformed data points into the second data warehouse.

2. The system according to claim 1, wherein one of the one or more transformation processes comprises a precision-adjustment process comprising rounding numerical values according to one or more standards of numerical precision associated with the second data format.

3. The system according to claim 1, wherein one of the one or more transformation processes comprises a data type conversion process comprising converting first data having a first data type stored in the first data warehouse into second data having a second data type recognized by the second data warehouse.

4. The system according to claim 1, wherein one of the one or more transformation processes comprises a single rank process comprising ranking a data subset comprising a plurality of data points from the set of data points, wherein the single rank process ranks the data subset based on a single metric.

5. The system according to claim 1, wherein one of the one or more transformation processes comprises a date format process comprising converting first data having a first date format into second data having a second date format recognized by the second data warehouse.

6. The system according to claim 1, further comprising a distributed non-relational database that stores the set of data points.

7. The system according to claim 1, wherein the system is comprising dividing a plurality of processes of the ETL operation among a plurality of distributed computers for parallel processing.

8. A non-transitory computer-readable storage medium having computer-executable program instructions stored thereon that when executed by a processor cause the processor to perform steps establishing compatibility between a first data warehouse and a second data warehouse, the steps comprising:
   receiving, from a distribution processing module, a set of unprocessed, raw data points;
   storing, in a distributed file system, the set of data points according to a first data format;
   executing, using a first data warehouse, an extract, transform, and load (ETL) operation on the set of data points, the ETL operation comprising
   an extract process comprising selecting from the set of data points a subset of data points for transformation and loading into a second data warehouse that uses a second data format,
   one or more transformations processes each comprising transforming individual data points in the subset of data points to obtain a set of transformed data points having the second data format, and
   a load process comprising loading the set of transformed data points into the second data warehouse; and
   scheduling execution of the ETL operation according to a workflow implemented as a directed acyclic graph comprising a plurality of action nodes that each specify an action to perform for the ETL operation wherein the plurality of action nodes comprise at least one action node that specifies a map and reduce process to perform on the subset of data points;

wherein the one or more transformation processes comprise a group rank process, the group rank process comprising ranking a data subset that comprises a plurality of data points from the set of data points, the ranking based on a plurality of metrics, and the group rank process further comprising storing the data subset in a ranked data table comprising a first column corresponding to a first metric of the plurality of metrics, a second column corresponding to a second metric of the plurality of metrics, and a third column corresponding to a rank.

9. The computer-readable storage medium of claim 8, wherein one of the one or more transformation processes comprises a precision-adjustment process comprising rounding off numerical values according to one or more standards of numerical precision associated with the second data warehouse.

10. The computer-readable storage medium of claim 8, wherein one of the one or more transformation processes comprises a data type conversion process comprising converting first data having a first data type stored in the first data warehouse into second data having a second data type recognized by the second data warehouse.

11. The computer-readable storage medium of claim 8, wherein one of the one or more transformation processes comprises a single rank process comprising ranking a data subset comprising a plurality of data points from the set of data points, wherein the single rank process ranks the data subset based on a single metric.

12. The computer-readable storage medium of claim 8, wherein one of the one or more transformation processes comprises a date format process comprising converting first data having a first date format into second data having a second date format recognized by the second data warehouse.

13. The computer-readable storage medium of claim 8, wherein the computer-executable instructions, when executed by the processor, cause the processor to perform steps further comprising storing, in a distributed non-relational database, the set of data points.

14. The computer-readable storage medium of claim 8, wherein the computer-executable instructions, when executed by the processor, cause the processor to perform steps further comprising dividing a plurality of processes of the ETL operation among a plurality of distributed computers for parallel processing.

15. A method of establishing compatibility between a first data warehouse and a second data warehouse comprising:
receiving a set of unprocessed, raw data points;
storing the data points in a distributed file system according to a first data format;
executing an extract, transform, and load (ETL) operation on the set of data points, the ETL operation comprising
an extract process comprising selecting from the set of data points a subset of data points for transformation and loading into a second data warehouse that uses a second data format,
one or more transformations processes each comprising transforming individual data points in the subset of data points to obtain a set of transformed data points having the second data format, and
a load process comprising loading the set of transformed data points into the second data warehouse; and
scheduling execution of the ETL operation according to a workflow implemented as a directed acyclic graph comprising a plurality of action nodes that each specify an action to perform for the ETL operation wherein the plurality of action nodes comprise at least one action node that specifies a map and reduce process to perform on the subset of data points;
wherein the one or more transformation processes comprise a group rank process, the group rank process comprising ranking a data subset that comprises a plurality of data points from the set of data points, the ranking based on a plurality of metrics, and the group rank process further comprising storing the data subset in a ranked data table comprising a first column corresponding to a first metric of the plurality of metrics, a second column corresponding to a second metric of the plurality of metrics, and a third column corresponding to a rank.

16. The method of claim 15 wherein:
the first data warehouse is an open-source data warehouse;
the second data warehouse is a commercially available data warehouse; and
the distributed file system is an open-source distributed file system.

* * * * *